(12) United States Patent
Dominke et al.

(10) Patent No.: US 6,820,220 B1
(45) Date of Patent: Nov. 16, 2004

(54) CONTROL UNIT FOR CONTROLLING SAFETY-CRITICAL APPLICATIONS

(75) Inventors: Peter Dominke, Bietigheim Bissingen (DE); Wolfgang Pfeiffer, Grossbottwar (DE); Werner Harter, Illingen (DE); Thomas Lindenkreuz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/889,730

(22) PCT Filed: Jan. 18, 2000

(86) PCT No.: PCT/DE00/00157

§ 371 (c)(1),
(2), (4) Date: Oct. 22, 2001

(87) PCT Pub. No.: WO00/43797

PCT Pub. Date: Jul. 27, 2000

(30) Foreign Application Priority Data

Jan. 20, 1999 (DE) .......................... 199 02 031

(51) Int. Cl.[7] .............................................. G06F 11/00
(52) U.S. Cl. ........................................ 714/30; 713/340
(58) Field of Search ............................ 714/22, 30, 31, 714/32, 33; 713/340

(56) References Cited

U.S. PATENT DOCUMENTS

| 4,797,541 A | * | 1/1989 | Billings et al. ............. 235/449 |
| 5,436,837 A | | 7/1995 | Gerstung et al. |
| 5,625,300 A | * | 4/1997 | Sachdev ...................... 324/765 |
| 6,550,033 B1 | * | 4/2003 | Dwork ........................ 714/733 |
| 2003/0126474 A1 | * | 7/2003 | Sawyers et al. ............. 713/300 |
| 2003/0126477 A1 | * | 7/2003 | Zhang et al. ................ 713/300 |

FOREIGN PATENT DOCUMENTS

| DE | 36 39 065 | | 5/1988 |
| DE | 43 05 288 | | 8/1994 |
| DE | 196 11 520 | | 9/1997 |
| EP | 0 322 141 | | 6/1989 |
| JP | 9-172818 | * | 6/1997 |
| WO | PCT/DE00/00157 | * | 7/2000 |

OTHER PUBLICATIONS

E. Bohl et al.: "The Fail–Stop Controller AE11", International Test Conference, Nov. 1, 1997.*

* cited by examiner

*Primary Examiner*—Bryce P. Bonzo
(74) *Attorney, Agent, or Firm*—Kenyon and Kenyon

(57) ABSTRACT

A control unit, for controlling safety-critical applications, includes a microcomputer, a monitoring unit (check unit), and peripheral circuits (input/output), and in which, to improve the reliability of the error detection for such control units, and to expand the detection to additional error types, the monitoring unit includes a first apparatus, arrangement or structure for measuring the quiescent current of the microcomputer; at least one quiescent current handshake line for controlling the measurement of the quiescent current running between the first apparatus, arrangement or structure of the monitoring unit and the microcomputer; the monitoring unit including a second apparatus, arrangement or structure for applying a test data input signal to the microcomputer, for processing the test data input signal, and for comparing the corresponding test data output signal of the microcomputer to the corresponding test data output signal of the monitoring unit; and at least one test data signal transmission line running between the second apparatus, arrangement or structure of the monitoring unit and the microcomputer.

14 Claims, 3 Drawing Sheets

CONTROL UNIT FOR CONTROLLING SAFETY-CRITICAL APPLICATIONS

FIELD OF THE INVENTION

The present invention relates to a control unit for controlling safety-critical applications, having a microcomputer (MC), a monitoring unit (check unit, CU), and peripheral circuits (input output, IO). Furthermore, the present invention relates to a method for checking a microcomputer (MC) of a control unit for controlling safety-critical applications, the control unit having microcomputer (MC), a monitoring unit (check unit, CU), and peripheral circuits (input output, IO).

BACKGROUND INFORMATION

In control units that control or regulate applications or functions that are critical with regard to safety, errors of the microcomputer (MC) or of a processor of the microcomputer may be detected by monitoring. Such control units having safety tasks are used, for example, for anti-lock braking systems, for traction control systems, and/or for electronic stability programs. The safety-critical applications controlled by the control unit are connected to the control unit via the peripheral circuits. In the case of single-computer control units, methods having a self-test, plausibility check, and watchdog may be available.

For testing CMOS chips (integrated circuits, IC) at the manufacturer, methods and measuring devices for measuring the quiescent current are used. The background of the so-called quiescent current test is that in a digital CMOS chip in purely static logic, it is believed that almost the entire power loss during the switching operations occurs in its interior. In the rest state, the current flow is restricted to tiny leakage currents as well as to currents through pullup resistors or pulldown resistors at the inputs and through external loads at the output drivers.

It is believed that various production-dependent errors may lead to increased conductivity between the positive and negative supply voltage, and that activating such defective regions (point defects) of the circuit causes the current consumption to increase abruptly. Such defects may be Ad ascertained by a highly exact measurement of the current consumption during the test operation and a comparison to corresponding setpoint values. As already stated, such a quiescent current measurement may be used in the manufacture of CMOS chips to sort out the defective chips after the manufacturing process.

The quiescent current test method, which is believed to be available for use in the manufacturing of computer modules for the control units (as referred to above), to test the computer modules during their normal operation for detecting what may be the most frequent defects in the computer modules, in particular in the microcomputer (MC), e.g. lock-up errors (stuck-at), bridge errors (bridging), and/or interrupt errors (stuck-open).

An available approach for increasing reliability in the case of control units (as referred to above) involves providing two MCs, which reciprocally test one another by parallel computing and/or plausibility checks. However, cost considerations may suggest using only one MC for such control units.

SUMMARY OF THE INVENTION

An object of an exemplary method and/or exemplary embodiment of the present invention is to provide a control unit in which the reliability of the error detection is improved, and the detection is expanded to additional types of errors.

In an exemplary embodiment of the present invention, the monitoring unit (CU) has a first apparatus, arrangement or structure for measuring the quiescent current of the microcomputer (MC), at least one handshake line for controlling the measurement of the quiescent current runs between the first apparatus, arrangement or structure of the CU and the MC, the CU has a second apparatus, arrangement or structure for applying a test data input signal to the MC to process the test data input signal and compare the corresponding test data output signal of the MC to the corresponding test data output signal of the CU, and at least one test data signal transmission line runs between the second apparatus, arrangement or structure of the CU and the MC.

In accordance with the exemplary embodiment and/or exemplary method of the present invention, the reliability of the error detection can be increased by using two different test methods that supplement one another. In this manner, it is believed that a significantly greater number of different error types of the computer modules of the MC can be detected.

The control unit according to the exemplary embodiment of the present invention can also have a plurality of MCs and a plurality of CUs. However, the following assumes that the control unit has one MC and one CU. The CU of the control unit according to the exemplary embodiment of the present invention has a first apparatus, arrangement or structure for measuring the quiescent current of the MC.

At least one handshake line for controlling the measurement of the quiescent current runs between the first apparatus, arrangement or structure of the CU and the MC. The handshake line can, for example, be a bidirectional line.

After the control unit is switched on, the quiescent current is measured for a set number (typically 8 to 16) of selected commands within the framework of a test program. For example, 14 selected commands containing an internal machine cycle are processed for microcomputer TMS470.

To supplement the quiescent current measurement, the CU of the control unit according to the exemplary embodiment of the present invention has a second apparatus, arrangement or structure. At least one transmission line for test data signals runs between the second apparatus, arrangement or structure of the CU and the MC.

The second apparatus, arrangement or structure applies a test data signal to the MC. The MC calculates a test data output signal, which is dependent upon the test data input signal and the states inside the MC. Defective states result in a changed test data output signal of the MC.

In the second apparatus, arrangement or structure of the CU, the test data input signal is also processed to form a test data output signal that is used as a reference signal for checking the test data output signal of the MC. When calculating the test data output signal, the CU assumes an error-free, functioning MC. The completed calculation may have a "very simple" design.

The microcomputer does not have a double design, and the same computation is not carried out by the CU as by the MC, as is the case for parallel computer systems. Rather, starting from the input data of a predefined test function, the MC calculates the output data whose results are checked by the CU using the reference signal calculated by it. The test function used for calculating the output data may be "very simple" in its implementation. The calculation only requires minimal computing time. However, complex tests and results from the application programs can also be included in this test function.

Finally, the test data output signal of the CU is compared to the test data output signal of the MC. If they deviate from one another, or if the deviation exceeds a predetermined threshold value, the CU recognizes an error of the MC. The test result can be displayed by a display device and/or it can be provided that upon occurrence of an error, and the system may be controlled and/or regulated by the control unit to be switched off.

According to another exemplary embodiment of the present invention, the first apparatus, arrangement or structure includes an IDDQ measuring circuit, a voltage supply, an IDDQ measuring run control (MAS), and a control system of the CU, and that the connection between the first apparatus, arrangement or structure, and the MC includes two handshake lines that run from the IDDQ-MAS to the MC and at least one voltage supply line that runs from the voltage supply to the MC, at least one of the voltage supply lines running through {or across} the IDDQ measuring circuit. In semiconductors, IDD designates the positive supply current. IDDQ designates the quiescent current. The handshake lines are, for example, configured as START and END handshake lines for starting and acknowledging the completion of the functional test.

The communication between the MC and the CU for measuring the quiescent current is carried out via the two handshake lines. The quiescent current of the MC is measured by the CU via the separate voltage supply lines.

As stated, the exemplary embodiment of the present invention relates to a control unit having a monitoring unit for checking the microcomputer of the control unit. A voltage supply unit is provided for supplying voltage to the control unit and, as such, also to the microcomputer. The control unit of the CU includes an apparatus, arrangement or structure that can bring the MC into specific operating states.

Furthermore, the IDDQ measuring circuit includes a measuring apparatus, arrangement or structure that ascertains the current or voltage in the voltage supply circuit of the MC, whereupon the determined current or the determined voltage may be compared in a comparison apparatus, arrangement or structure, also present in the IDDQ measuring circuit, to at least one predefined threshold value.

By measuring the current or voltage, a plurality of possible errors in the computer can be ascertained using the IDDQ measurement. In this context, it is believed that what may be the most frequent errors in the components of the MC can be substantially covered using a minimum of test steps. Such errors can be lock-up errors (stuck-at), bridge errors (bridging), and/or interrupt errors (stuck-open).

As a result of the combination of the quiescent current measurement and another suitable checking method, in particular including a check of the functionality of the MC based on test data records, it is believed that errors may be widely covered with respect to the significant errors in computer modules, in particular in CMOS processors, in a way that may be particularly advantageous for safety-critical applications.

The abovementioned elimination of the second processor is largely retained so as to provide an economic advantage of the control unit according to the exemplary embodiment of the present invention, since the quiescent current measurement according to the exemplary embodiment of the present invention may only require a minimal hardware expenditure.

By specially controlling the MC, the IDDQ-MAS brings predetermined components of the MC into a low-current state. The background of this control involves the fact that components present in the MC may require a relatively high current. Since, as stated at the outset, the quiescent current measurement may be based on fluctuations in the quiescent current within relatively small bandwidths, the high current consumption of the MC components interfere with the IDDQ measurement. In particular, the components to which the IDDQ measurement does not apply are brought into a low-current state. Such components can be the MC output stage and/or an input stage (e.g. analog/digital converter), as well as circuits for internally multiplying the clock pulse.

In the simplest case, the components having high current consumption are switched off during the test. Thus, internal circuit elements and circuit outputs that carry high currents are switched off. Subsequently, the quiescent current can be measured.

In addition to switching off the components of the MC having high current as mentioned above, the core of the MC may be brought into a state of low current consumption. In the case of such MC modules configured specifically for the quiescent current measurement, a special operating state, a so-called IDDQ test mode, may be provided. In this operating state, all currents inside of the computer are switched off, i.e., the current in the MC core is minimized.

The IDDQ design is such that standard errors in the MC core become noticeable as an increase in the quiescent current. Thus, for example, short-circuit errors and/or stuck-at errors (short circuit to ground or the supply voltage) are "immediately" or quickly manifested in an increase in the quiescent current. In this context, it is not believed to be necessary to pass on (to propagate) the effect of such an error to the outputs of the MC. The increased current consumption is the immediate error indicator.

In addition to the IDDQ test mode described above, it can be provided that only the MC components having a high current are switched off, and, in response to a command, the MC enters a defined low-current state. In this context, the MC core does not have to be specially configured for the IDDQ test mode. This is called the power-down mode.

The power-down mode is initiated by loading internal components of the computer, such as the register and memory, with certain patterns, and by bringing the above-mentioned computer components into a state of low current consumption, e.g., by executing a certain computer command. If this state is achieved, a clock generator can be selectively switched off or disconnected. Subsequently, the quiescent current or a corresponding voltage value is measured and compared to a threshold value corresponding to the above-set operating state (power-down state) of the MC core . If certain errors are present in the computer (stuck-at errors, bridging errors, stuck-open errors), the result may be an increase in the quiescent current or in the voltage drop caused by the quiescent current.

After such a test step, additional test steps can follow in that the power-down mode is first exited by applying certain signal levels to specific connections of the MC. By again starting or switching on the clock generator, the internal computer components, such as the register and the memory, are loaded with additional patterns, and the abovementioned components are again brought into a low-current state, e.g., by executing a specific computer command (power-down command). The above-described measurement of the quiescent current then follows. As a result of a plurality of such consecutively performed measurements of the power-down current, errors in the registers, memories, and components of the computer core may be ascertained in an increasingly more complete manner.

According to the exemplary computer and exemplary circuit, the individual test steps are ended by re-enabling the clock generator, by triggering a reset, or by triggering an external interrupt. After the last test step, the MC runs again in its normal operating mode (normal operation).

In addition to the above-described quiescent current measurement in the power-down mode, provision is also made in accordance with the exemplary embodiment of the present invention for the quiescent current to be measured in the indicated IDDQ test mode (provided the computer to be checked is suitably configured). The start of the IDDQ test mode is initiated by changing the signal level at a connection of the MC, for example. Also in this context, the register and memory are loaded with certain patterns prior to entering the IDDQ test mode.

Upon entering the IDDQ test mode, the computer components having high current consumption are switched off. Furthermore, by discontinuing or decoupling the time pulse while executing a command, the computer core can be kept in a state "typical" for this command. These commands are selected so that they adjust the states of the internal circuit nodes of the computer core so that as many errors as possible or at least more errors can be detected via the quiescent current measurement.

The handshake for the quiescent current measurement is carried out or performed in a number of steps:

S1: The MC sets the START signal to HIGH. Consequently, the CU knows that an IDDQ measurement is beginning.

S2: The MC can selectively prepare to stop the time pulse (master clock, MCLK), in that it sets a signal PREP to LOW via an internal command.

S3: The MC decodes the precisely defined instant within the next suitable command for the IDDQ test and also sets a signal DEKOD to LOW. Now the MCLK is set equal to LOW, and the digital component of the MC is set to static operation for the IDDQ measurement.

S4: The CU performs the IDDQ measurement.

S5: The CU outputs the level sequence LOW-HIGH-LOW at the signal END, thereby reactivating the MCLK.

S6: The MC becomes active again and confirms the end of the measurement by setting the START signal to LOW. The MC continues the program and prepares the next IDDQ measurement or ends the IDDQ measurement when all measurements have been carried out.

Two voltage supply lines may run between the voltage supply and the MC, one voltage supply line running through the IDDQ measuring circuit. The quiescent current of the MC is measured via the voltage supply line that runs through the IDDQ measuring circuit.

According to another exemplary embodiment of the control unit according to the present invention, the first apparatus, arrangement or structure includes an IDDQ measuring circuit, a voltage supply, an IDDQ measuring run control (MAS), and a control system of the CU, and the connection between the first apparatus, arrangement or structure and the MC includes four handshake lines that run from the IDDQ-MAS to the MC and at least one voltage supply line that runs from the voltage supply to the MC, at least one of the voltage supply lines running through the IDDQ measuring circuit.

In the case of four handshake lines, a time-pulse (CLK) line and a line for a power-down (PWRDN) control can be provided for the MC in addition to the lines START, END in the case of two handshake lines. In this exemplary embodiment of the control unit, a shared voltage supply line to the processor is sufficient, the quiescent current being measured in the voltage supply line. The clock generator is then stopped in the CU. The control of voltage supply circuits for analog circuits and IO circuits in the MC is carried out or performed via the PWRDN line from the CU. As such, only the quiescent current of the digital component of the MC flows in the measuring case through the shared voltage supply line.

Advantageously, the first apparatus, arrangement or structure includes an initialization circuit, which receives an initialization signal from the voltage supply after the control unit is switched on and subsequently transmits an enable signal to the IDDQ-MAS to enable the IDDQ measurement. The successful completion of the IDDQ measurement is signaled by an additional signal to the control system of the CU. Consequently, the CU advances the test run in that the initialization circuit enables the test data signal generator via an additional signal.

According to another exemplary embodiment of the present invention, the second apparatus, arrangement or structure includes a test data signal generator for applying a test data input signal to the MC, a response generator for processing the test data input signal and for forming a corresponding test data output signal, a test data register for transmitting and receiving test data, and a comparator for comparing the test data output signal of the MC to the test data output signal of the CU. The connection between the second apparatus, arrangement or structure and the MC includes at least one test data transmission line, which runs between the test data register and the MC. Advantageously, two test data transmission lines may run between the test data register and the MC.

The test data signal generator is also activated by the initialization circuit after the control unit is enabled. In the test data signal generator, the test data for the MC are generated in a virtually random order by a feedback shift register. With the aid of the Reed-Muller codes, the bit string for the test data output signal (the so-called reference signal) is formed in the response generator, for every test data input signal. This code is used to maintain a distance that is as great as possible in the space of numbers of the test data output signals (hamming distance). In the comparator, the theoretically calculated test data output signal from the response generator of the CU is then compared to the actual test data output signal of the MC from the test data register.

The second apparatus, arrangement or structure may also include a trigger generator, which determines the instant at which the test data output signal of the MC is available at the comparator, in the case of an error-free MC. The trigger generator stipulates the instant of the comparison of the determined test data output signal of the MC and the actual response of the CU. As a result, it is at least better ensured that the time slices in the MC proceed correctly. The comparator not only checks the test data output signal for the correct data value but also to determine whether the test data output signal is transmitted within a specific timing window.

Advantageously, the second apparatus, arrangement or structure includes an error counter, which counts up or down, if the test data output signal of the MC is not consistent with the test data output signal of the CU, and/or if the test data output signal of the MC is available at the comparator at an instant that differs from the one determined by the trigger generator. By a counting pulse, the comparator causes the error counter to count up or down. If the value and instant of the test data output signal are correct, the error counter is decremented, for example. If the error counter falls below a predefined value, an external warning light, for example, is switched on or off via a signal interface, and a relay for manipulating the safety-critical application is enabled.

The manipulation of the application to be controlled may be limited to discontinuing the application. In the case of special applications, it can, however, be useful for the error counter to have a plurality of response thresholds, exceeding the response threshold resulting in a different reaction in each case. As a result, the application can be prevented from being immediately interrupted in the case of a singular disturbance, and the disabling path can be checked by the computer.

If the MC responds to a test data input signal at the wrong instant or with an incorrect value, the same test data input signal is applied to the MC again until the instant and value of the test data output signal are correct. If this does not occur with a predefined time period, the CU switches off the control unit or the application, and it cannot be re-activated even by correct responses.

The second apparatus, arrangement or structure may include an initialization circuit, which receives an initialization signal from the voltage source after the control unit is enabled, subsequently synchronizes the CU with the MC, and then activates the test data signal generator and the error counter. The CU is synchronized with the MC in that the CU waits for the first data transmission of the MC.

An additional object of the exemplary embodiment of the present invention is to provide a method for checking a microcomputer so that the reliability of the error detection may be improved, and the detection may be expanded to additional types of errors.

To achieve this object, in the exemplary method of the present invention, the CU of the control unit measures the quiescent current of the MC and applies a test data input signal to the MC, determines a first test data output signal, and compares a second test data output signal of the MC to the first test data output signal of the CU.

Advantageously, the quiescent current measurement is in the form of an IDDQ measurement. The IDDQ measurement may be carried out or performed after the control unit is switched on after being enabled by an enable signal.

According to another exemplary method according to the present invention, the second test data output signal of the MC is compared to the first test data output signal of the CU while the control unit is in operation. This may have the advantage that the control unit does not have to be switched off to test the functionality of the microcomputer. Rather, MC computing power not used for controlling the application can be used to check the MC while the control unit is in operation.

A false test data output signal may be transmitted one time at regular intervals to the CU while the control unit is in operation to check the functionality of the disabling path.

Another exemplary embodiment of the present invention involves the fact that a clock generator is stopped by the MC during the IDDQ measurement and/or while the second test data output signal of the MC is being compared to the first test data output signal of the CU. The clock generator is provided in the control system of the CU. The internal computer operations in particular are controlled as a function of the output signal of this clock generator. In the described IDDQ test mode, it is provided that this clock generator is switched off or disabled or disconnected from the MC. This can also be carried out or performed in the power-down mode when a particularly low quiescent current is to be achieved. The clock generator is switched off or disabled or disconnected especially at the start of every quiescent current measurement.

The test data input signal of the CU may be generated by a test data signal generator, via a feedback shift register. The test data output signal of the CU may be generated by a response generator, with the aid of the Reed-Muller code.

The exemplary control unit according to the present invention can be checked by two different test runs. A so-called start-up test is carried out immediately following the switching on of the control unit and prior to the operation of the control unit for controlling or regulating the safety-critical application. After the start-up test, a so-called online test is carried out or performed from time to time while the control unit is in operation.

The start-up test is subdivided into two test segments, the so-called processor initialization segment (Proz-Init) and the subsequent so-called operating system initialization segment (BS-Init). The processor initialization segment includes a command test and a core test, a RAM/ROM test, and an IDDQ test. The operating system initialization segment includes a start-up control and a test of the CU. In the start-up control, different input values are tested on the control unit (e.g. a certain speed pattern of the wheels of a vehicle, as can typically occur at the input of an ABS control unit of the vehicle). The control unit carries out a regulation or control of the application based on the input values. The result of the simulated regulation or control is compared to corresponding setpoint values. When testing the CU, a defective MC is simulated, and the reaction of the CU to the defect is checked.

The online test has a command test and a core test, a RAM/ROM test, a test of the CU, and a replication test. In the replication test, double memory spaces are provided for certain safety-critical variables, and certain safety-critical calculations are carried out twice. The contents of the double memory spaces and the results of the double calculations are compared to one another. The redundant storing and the redundant calculation are carried out by a processor of the control unit.

Furthermore, the online test has a plausibility check in which control signals or regulation signals determined by the MC are checked for plausibility. In the case of an ABS control unit, one can, for example, check whether the speed, the acceleration, or the deceleration are within certain limits. Moreover, the values of the individual wheels of the vehicle must be in a certain relation to one another, which can also be checked. Finally, the online test has another operating system test and a test of the remaining monitoring units of the control unit.

DETAILED DESCRIPTION

Figure 1:
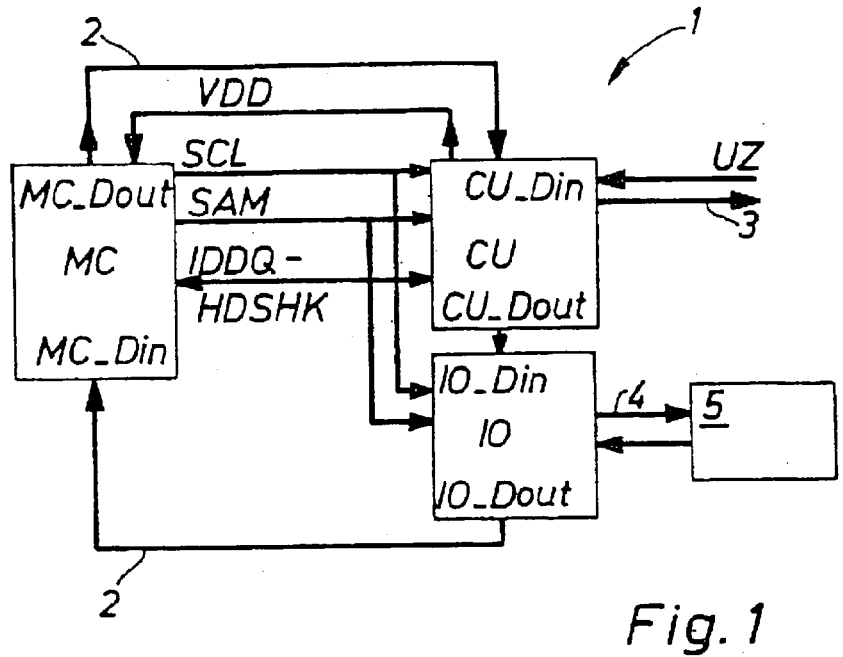
FIG. 1 shows a schematic block diagram of an exemplary control unit according to the present invention.

FIG. 1 shows a schematic block diagram of an exemplary control unit according to the present invention. Reference numeral 1 designates the exemplary control unit according to the present invention in its entirety. Control unit 1 is used to control safety-critical applications, e.g. for anti-lock (braking) systems, for traction control systems, and/or for electronic stability programs.

Control unit 1 has a microcomputer MC, a monitoring unit (CU, check unit), and peripheral circuits (IO, input/output). Microcomputer MC, monitoring unit CU, and peripheral circuits IC are connected in series via a serial synchronous databus 2. Via its data output line MC_Dout, microcomputer MC transmits the data output signals through databus 2 to the bus users and simultaneously receives the data input signals via its data input line MC_Din. Using the signal SAM (sample), the bus users store the data received in their storage registers. There are additional connecting lines between microcomputer MC and monitoring unit CU, namely a shared supply line VDD or alternatively, a plurality of supply lines VDD for a digital and analog supply of microcomputer MC. Finally, IDDQ handshake line IDDQ-HDSHK, which are used for controlling the quiescent current measurement (IDDQ measurement) of microcomputer MC, run between microcomputer MC and monitoring unit CU. So-called disabling paths 3 lead from monitoring unit CU to external warning lamps and/or relays to manipulate the safety-critical applications to be controlled, depending on whether monitoring unit CU detects an error of microcomputer MC. Peripheral circuits IO have connecting lines 4 to safety-critical application 5 to be controlled.

After control unit 1 is switched on, the quiescent current is measured to check the functionality of microcomputer MC. While control unit 1 is in operation, the functionality of microcomputer MC is checked in that it regularly receives test data records, and the corresponding second test data output signal of the MC is compared to an error-free first test data output signal calculated by monitoring unit CU.

Figure 2:
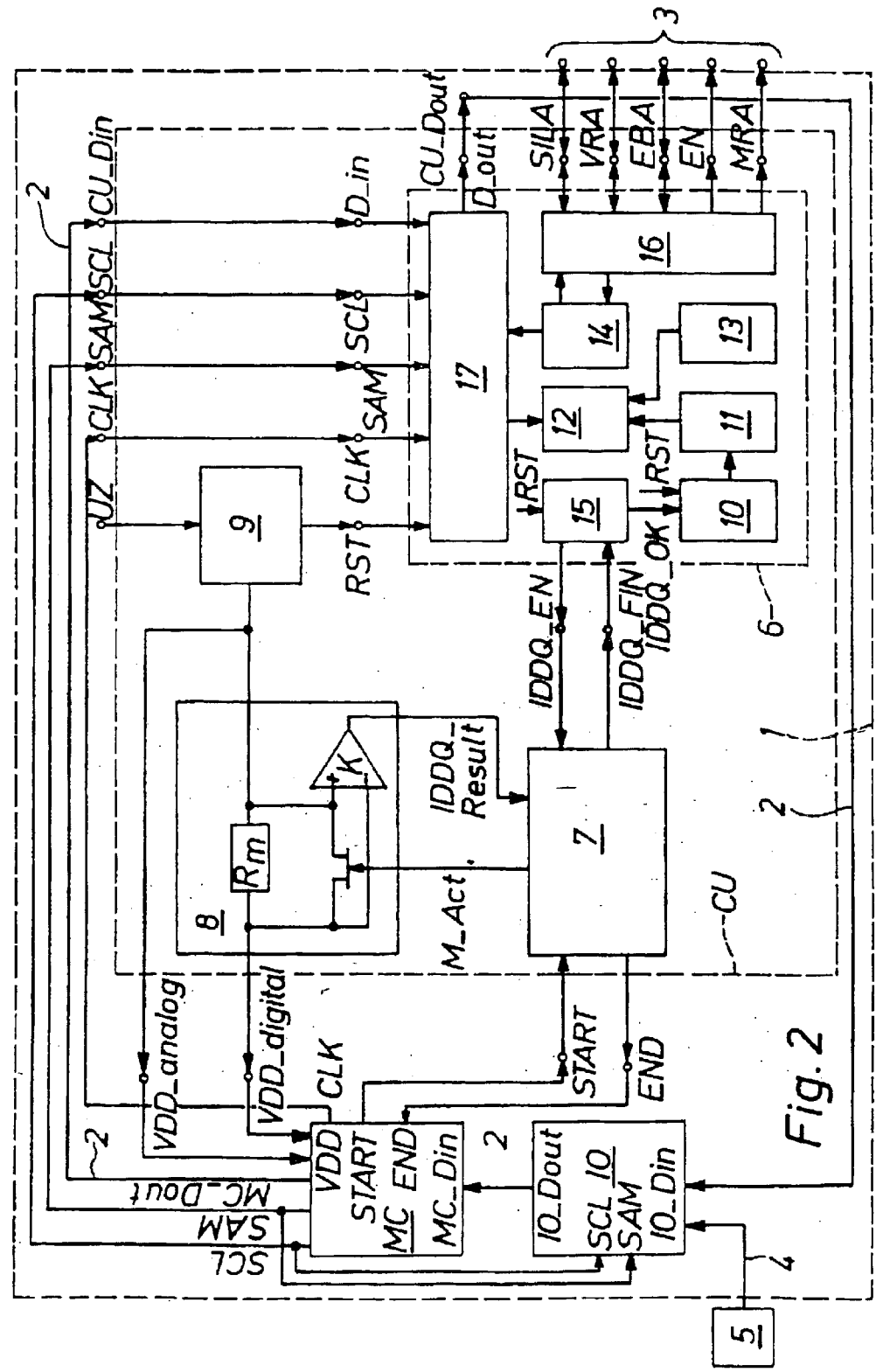
FIG. 2 shows a more detailed view of a block diagram of the control unit from FIG. 1.

FIG. 2 shows a detailed overview of a block diagram of the control unit 1 from FIG. 1. Monitoring unit CU includes a control system 6 of monitoring unit CU, a measuring run control 7 for the IDDQ measurement, an IDDQ measuring circuit 8, and a voltage supply 9. Control system 6 of monitoring unit CU includes a test data signal generator 10, a response generator 11, and a comparator 12. With the aid of test data signal generator 10, a test data input signal is applied to microcomputer MC, and the microcomputer determines a second test data output signal as a function of the test data input signal and its own internal states.

Response generator 11 processes the same test data input signal and forms a corresponding first test data output signal. In comparator 12, the first test data output signal of monitoring unit CU is compared to the second test data output signal of microcomputer MC. A trigger generator 13 determines the instant at which the second test data output signal of microcomputer MC is available at comparator 12, given an error-free, functioning microcomputer MC.

Control system 6 of monitoring unit CU further has a error counter 14, which counts an error, if the second test data output signal of microcomputer MC is not consistent with the first test data output signal of monitoring unit CU, and/or if the second test data output signal of microcomputer MC is available at comparator 12 at a different instant than the one determined by trigger generator 13.

Furthermore, control system 6 of monitoring unit CU has a test data register 17, which is used for transmitting and receiving test data.

Finally, control system 6 of monitoring unit CU also has an initialization circuit 15, which receives an initialization signal RST from voltage supply 9 after control unit 1 is switched on and-subsequently synchronizes monitoring unit CU with microcomputer MC in that the monitoring unit waits for the first data transmission of the MC. Initialization circuit 15 subsequently activates test data signal generator 10 and error counter 14.

In test data signal generator 10, the test data input signals for microcomputer MC are generated in a virtually random order by a feedback shift register. With the aid of the Reed-Muller codes, the bit string for the corresponding first test data output signal is formed in response generator 11, for every test data input signal. This code is used to maintain a distance that is as great as possible in the space of numbers of the test data output signals (hamming distance). In comparator 12, the first test data output signal determined in response generator 11 is then compared to the actual second test data output signal of microcomputer MC.

The instant of the comparison is specified by trigger generator 13. This is intended to ensure that the time slices in microcomputer MC proceed correctly. Comparator 12 not only checks the second test data output signal of the MC for the correct data value but also to determine whether the test data output signal is transmitted within a specific timing window. If the value and instant of the second test data output signal of the MC are correct, error counter 14 is decremented, and the safety-critical application to be controlled is kept in an active state via a signal interface 16 in that external warning lights are switched off and the relays for triggering application 5 are activated.

In every cycle following this first cycle, the instant and value of the second test data output signal of the MC must be correct to prevent error counter 14 from responding immediately Error counter 14 has a plurality of response thresholds to prevent control unit 1 or application 5 from being switched off in the case of a singular disturbance and to enable microcomputer MC to check the disabling path. The first step blocks the valve output stages via signal EN and switches off the voltage supply of the valves via valve relay VRA. The display of the warning lights SILA is delayed by one cycle, so that there is no display when testing the disabling path.

If a test data input signal is responded to at the wrong instant or with an incorrect value, the same test data input signal is applied again to microcomputer MC until the instant and value are correct. If this does not occur within a predefined time period, monitoring unit CU switches off the control unit 1, and it can no longer be activated even by correct responses.

After control unit 1 is switched on, the quiescent current is measured for a set number (typically 8 to 16) of selected instants of a test program. The communication between microcomputer MC and monitoring unit CU for measuring the quiescent current is carried out via the two handshake lines START and END. While the quiescent current is being measured, microcomputer MC stops clock generator CLK. Between monitoring unit CU and microcomputer MC are two separate voltage supply lines, VDD_digital for supplying the digital component of microcomputer MC and VDD_analog for supplying the analog component of microcomputer MC. The quiescent current is measured in voltage supply line VDD_digital.

The quiescent current measurement is enabled after the voltage supply is switched on via signal IDDQ_EN of control system 6 of monitoring unit CU. The successful completion of the quiescent current measurement is signalized to control system 6 of monitoring unit CU by signal IDDQ_FIN. Consequently, monitoring unit CU advances the test run in that initialization circuit 15 enables test data signal generator 10 via a signal IDDQ_OK.

Figure 4:
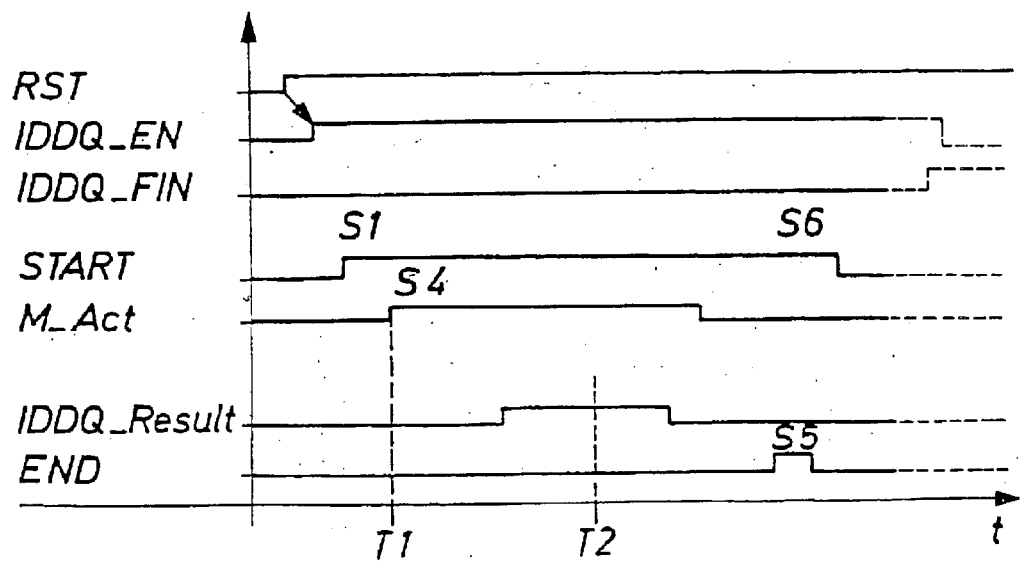
FIG. 4 shows a timing diagram of the measuring run control for the quiescent current from FIG. 3.
Figure 3:
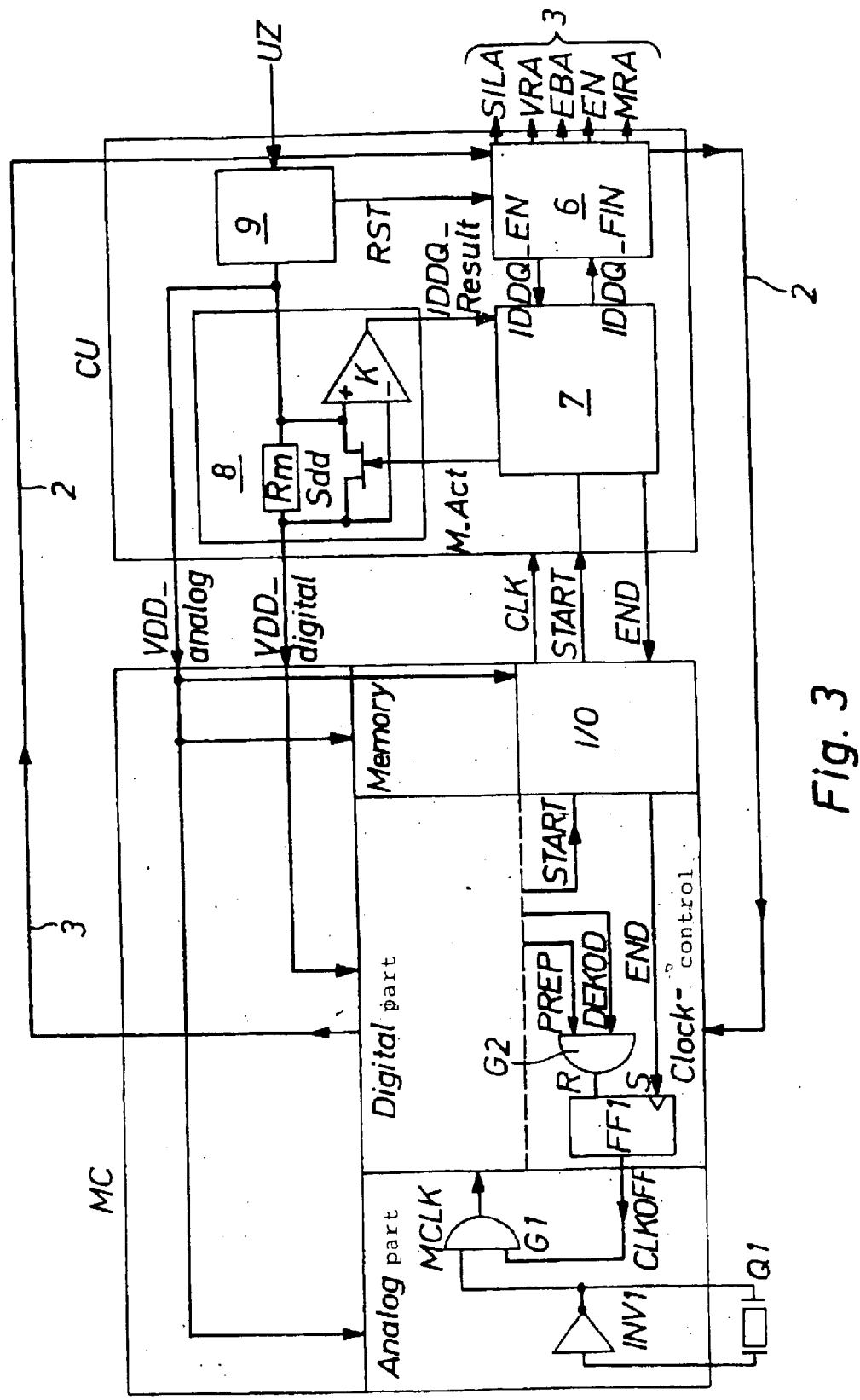
FIG. 3 shows an exemplary circuit configuration for a quiescent current measurement including a two-wire handshake.

FIG. 3 shows a circuit configuration for measuring the quiescent current including a two-wire handshake. FIG. 4 shows the timing diagram of measuring run control 7 for the quiescent current measurement from FIG. 3. After control unit 1 is switched on, microcomputer MC starts its self-test. Part of this self-test is the quiescent current measurement. If the functional sequence in microcomputer MC reaches the quiescent current test, the START signal is activated. At instant T1, the quiescent current measurement is activated by signal_Act. The output of comparator 12 for the quiescent current measurement is evaluated after time T2. If the value is acceptable, microcomputer MC is activated again by the END signal. If the value is outside of a limiting value, the measurement is repeated. The number of repetitions is preset.

If repeating the measurement also does not produce a correct response, the measurement is discontinued, and monitoring unit CU does not switch on microcomputer MC but remains in a fail-safe mode. When all quiescent current measurements are completed, signal IDDQ_FIN is set to HIGH. Consequently, control system 6 of monitoring unit CU resets signal IDDQ_EN from HIGH to LOW.

What is claimed is:

1. A control unit for controlling a safety-critical application, the control unit comprising:
   a microcomputer;
   a monitoring unit including a first arrangement for measuring a quiescent current of the microcomputer, and including a second arrangement for applying a test data input signal, for processing test data output signals and for comparing a corresponding test data output signal of the microcomputer to a corresponding test data output signal of the monitoring unit;
   at least one quiescent current handshake line running between the first arrangement and the microcomputer for controlling the measuring of the quiescent current;
   at least one test data signal transmission line running between the second arrangement and
   the microcomputer; and
   peripheral circuits;
   wherein:
   the first arrangement includes an IDDQ measuring circuit, a voltage supply, an IDDQ measuring run control, and a control system of the monitoring unit;
   the at least one quiescent current handshake line includes two handshake lines running from the IDDQ measuring run control to the microcomputer;
   the first arrangement and the microcomputer are coupled by the two handshake lines and at least one voltage supply line running from the voltage supply to the microcomputer; and
   at least one of the at least one voltage supply line runs through the IDDQ measuring circuit.

2. The control unit of claim 1, wherein the at least one voltage supply line includes two voltage supply lines running between the voltage source and the microcomputer, and one of the two voltage supply lines runs through the IDDQ measuring circuit.

3. The control unit of claim 1, wherein the first arrangement includes an initialization circuit for receiving an initialization signal from the voltage source after the control unit is switched on, and for subsequently transmitting an enable signal to the IDDQ measuring run control to enable an IDDQ measurement.

4. The control unit of claim 1, wherein:
   the second arrangement includes a test data signal generator for applying the test data input signal to the microcomputer, a response generator for processing the test data input signal and for forming the corresponding test data output signal, a test data register for receiving the test data input signal and for transmitting the corresponding test data output signal, and a comparator for comparing the corresponding test data output signal of the microcomputer to the corresponding test data output signal of the monitoring unit; and
   the at least one test data transmission line runs between the test data register of the second arrangement and the microcomputer.

5. The control unit of claim 4, wherein the at least one test data transmission line includes two test data transmission lines.

6. The control unit of claim 4, wherein the second arrangement includes a trigger generator for determining an instant at which the corresponding test data output signal of the microcomputer is available at the comparator, the microcomputer being error-free.

7. The control unit of claim 4, wherein the second arrangement includes an error counter for counting an error if at least one of the following is satisfied: the corresponding test data output signal of the microcomputer is not consistent with the corresponding test data output signal of the monitoring unit; and the corresponding test data output signal of the microcomputer is available at the comparator at a different instant than one determined by the trigger generator.

8. A control unit for controlling a safety-critical application, the control unit comprising:
   a microcomputer;
   a monitoring unit including a first arrangement for measuring a quiescent current of the microcomputer, and including a second arrangement for applying a test data input signal, for processing test data output signals and for comparing a corresponding test data output signal of the microcomputer to a corresponding test data output signal of the monitoring unit;
   at least one quiescent current handshake line running between the first arrangement and the microcomputer for controlling the measuring of the quiescent current;
   at least one test data signal transmission line running between the second arrangement and the microcomputer; and
   peripheral circuits;
   wherein:
   the second arrangement includes a test data signal generator for applying the test data input signal to the microcomputer, a response generator for processing the test data input signal and for forming the corresponding test data output signal, a test data register for receiving the test data input signal and for transmitting the corresponding test data output signal, and a comparator for comparing the corresponding test data output signal of the microcomputer to the corresponding test data output signal of the monitoring unit;
   the at least one test data transmission line runs between the test data register of the second arrangement and the microcomputer;
   the second arrangement includes an error counter for counting an error if at least one of the following is satisfied: the corresponding test data output signal of the microcomputer is not consistent with the corresponding test data output signal of the monitoring unit; and the corresponding test data output signal of the microcomputer is available at the comparator at a different instant than one determined by the trigger generator; and there is a plurality of response thresholds for use with the error counter, and a different reaction results by exceeding each response threshold of the plurality of response thresholds results.

9. A control unit for controlling a safety-critical application, the control unit comprising:

a microcomputer;

a monitoring unit including a first arrangement for measuring a quiescent current of the microcomputer, and including a second arrangement for applying a test data input signal, for processing test data output signals and for comparing a corresponding test data output signal of the microcomputer to a corresponding test data output signal of the monitoring unit;

at least one quiescent current handshake line running between the first arrangement and the microcomputer for controlling the measuring of the quiescent current;

at least one test data signal transmission line running between the second arrangement and the microcomputer; and peripheral circuits;

wherein:

the second arrangement includes a test data signal generator for applying the test data input signal to the microcomputer, a response generator for processing the test data input signal and for forming the corresponding test data output signal, a test data register for receiving the test data input signal and for transmitting the corresponding test data output signal and a comparator for comparing the corresponding test data output signal of the microcomputer to the corresponding test data output signal of the monitoring unit;

the at least one test data transmission line runs between the test data register of the second arrangement and the microcomputer;

the at least one test data transmission line includes two test data transmission lines; and the second arrangement includes an initialization circuit for receiving an initialization signal from the voltage source after the control unit is switched on, for subsequently synchronizing the monitoring unit with the microcomputer, and for then activating the test data signal generator and the error counter.

10. A method for testing a microcomputer of a control unit for controlling safety-critical application, the control unit including the microcomputer, a monitoring unit, and peripheral circuits, the method comprising:

measuring a quiescent current of the microcomputer, the measuring of the quiescent current being controlled by the monitoring unit;

exchanging at least one handshake signal between the microcomputer and the monitoring unit;

applying a test data input signal to the microcomputer;

determining a first test data out signal; and comparing a second test data output signal of the microcomputer to the first test data output signal of the monitoring unit;

wherein a quiescent current measurement corresponds to an IDDQ measurement, and wherein a clock generator is stopped by the microcomputer during at least one of: the IDDQ measurement; and the comparing of the second test data output signal of the microcomputer with the first test data output signal of the monitoring unit.

11. The method of claim 10, wherein the second test data output signal of the microcomputer is compared to the first test data output signal of the monitoring unit while the control unit is operating.

12. A method for testing a microcomputer of a control unit for controlling safety-critical application, the control unit including the microcomputer, a monitoring unit, and peripheral circuits, the method comprising:

measuring a quiescent current of the microcomputer, the measuring of the quiescent current being controlled by the monitoring unit;

exchanging at least one handshake signal between the microcomputer and the monitoring unit;

applying a test data input signal to the microcomputer;

determining a first test data output signal; and comparing a second test data output signal of the microcomputer to the first test data output signal of the monitoring unit;

wherein a quiescent current measurement corresponds to an IDDQ measurement, and wherein the test data input signal of the monitoring unit is generated by a test data signal generator via a feedback shift register.

13. The method of claim 12, wherein the test data output signal of the monitoring unit is generated by a response generator using a Reed-Muller code.

14. The method of claim 12, wherein the second test data output signal of the microcomputer is compared to the first test data output signal of the monitoring unit while the control unit is operating.

* * * * *